Patented Jan. 1, 1952

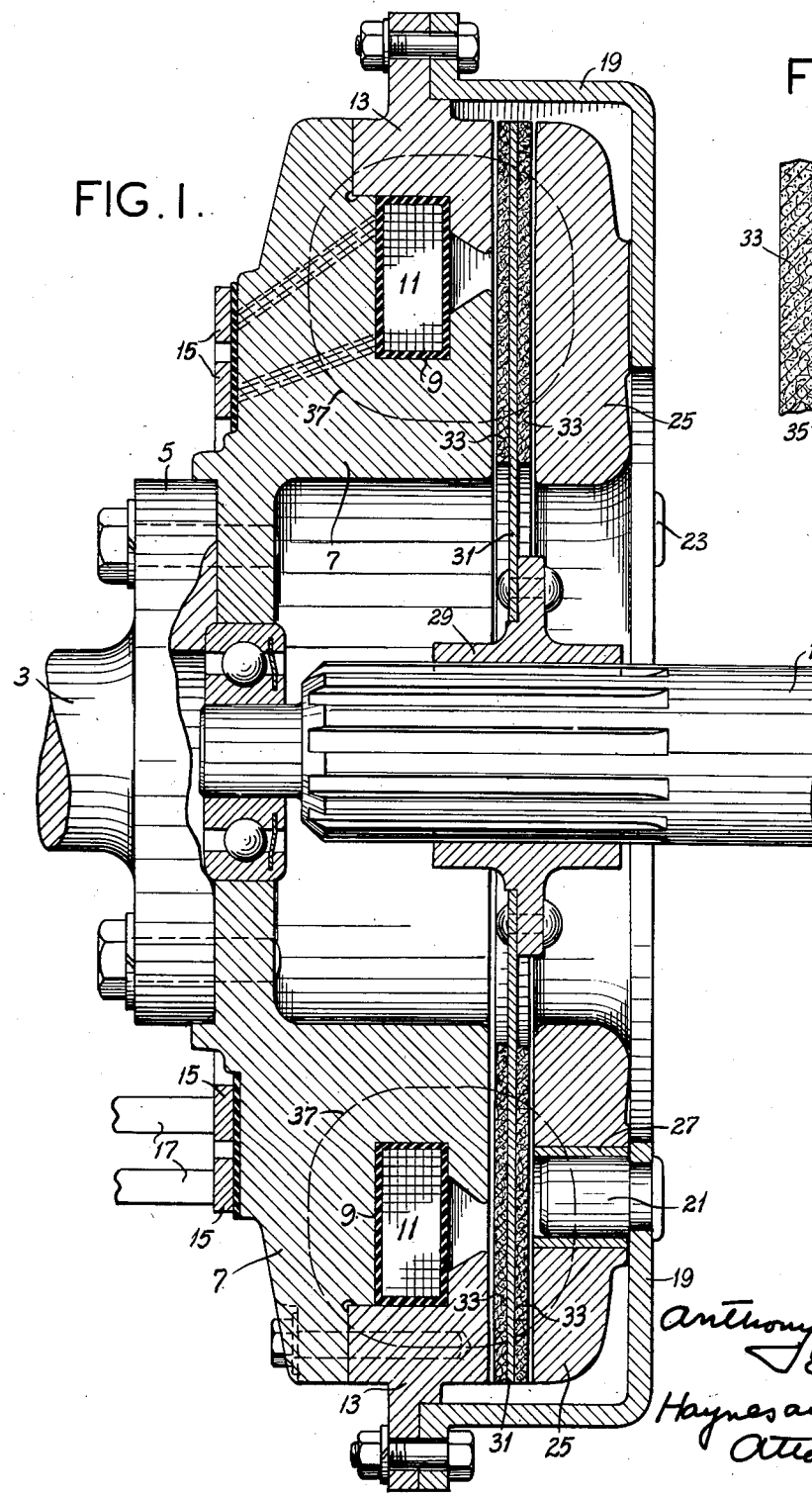
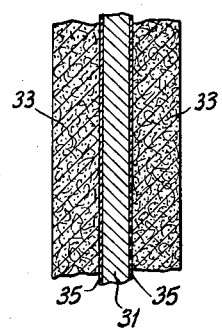

2,580,869

UNITED STATES PATENT OFFICE 2,580,869

MAGNETIC CLUTCH WITH A MAGNETIC LINING

Anthony Winther, Kenosha, Wis., assignor to Martin P. Winther, Waukegan, Ill., as trustee Application May 6, 1949, Serial No. 91,792

5 Claims. (Cl. 192—84)

This invention relates to magnetic clutches, and more particularly to clutches of this type which for operation depend upon friction and which therefore require frictional clutch linings, facings, or wear surfaces.

In any clutch wherein torque transmission depends upon friction engaging surfaces, it is practically necessary that a suitable wearing surface be provided, generally known as a clutch lining or facing. If in a clutch of the above class a magnetic circuit is employed traversing the clutch surfaces, an inherent difficulty is encountered in that the usual nonmagnetic clutch facings or linings increase the reluctance of the gap between magnetic parts to such a degree that large magnetomotive forces are required in the exciting magnets or electromagnets.

Briefly, the present invention has two aspects, first the provision of a lined magnetic clutch in which the lining that is used is magnetic and moreover is of such magnetic properties as to reduce said reluctance and said magnetomotive forces without destroying desirable modulating characteristics required of the clutch; and second the provision of a suitable clutch lining for the purpose. While the invention is described in connection with a clutch in which both driving and driven members are rotary, it is to be understood that it is also applicable to equivalent structures such as brakes, which are in effect clutches wherein one member is stationary. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section through a clutch embodying the invention; and, Fig. 2 is an enlarged detail section of a clutch plate of Fig. 1, including its facings.

Similar reference characters indicate corresponding parts throughout the several views of the drawings.

Referring now to the drawings, numeral 1 indicates a driven shaft and numeral 3 a drive shaft. The driving and driven relationships between these members may be interchanged without affecting the substance of the invention. Shaft 3 may, for example, be the crankshaft of an automotive engine. To a flange 5 of this shaft is bolted a magnetic (iron, soft steel or the like) clutch ring 7 in which is an annular groove 9 carrying an annular field coil 11. Attached to the ring 7 is a second magnetic (iron, soft steel or the like) ring 13 which completes the enclosure for the coil 11. The right-hand ferrous metal faces of members 7 and 13 are coplanar. The coil 11 may be excited by means of a circuit traversing collector rings 15, against which bear brushes 17. If desired, one collector ring may be used and the coil 11 grounded to complete a circuit. Bolted to the ring 13 is a casing 19 which is preferably nonmagnetic (aluminum, brass or the like). On this casing are supporting studs, one of which is shown in the cross section at 21. Another appears behind the section at 23 and a third (not shown) will be forward of the section. Any suitable number of these studs 21, 23 may be employed. Within the casing 19 is a magnetic (iron, soft steel or the like) ring 25 which is slidably carried on the studs 21, bushings 27 being used for the purpose. The left-hand ferrous metal face of ring 25 is flat.

Splined to the shaft 1 is a hub 29 carrying a magnetic (soft steel) clutch plate 31. This plate extends radially in a plane relationship between rings (7, 13) and 25. Attached to opposite ferrous metal faces of the plate 31 are annular liner rings 33. The attachment may be by riveting or by the use of clutch or brake facing cement 35, both of which are known for the purpose.

When the coil 11 is excited, a toroidal flux field is generated. This is illustrated diagrammatically by the dash lines 37. There are many more of these toroidal flux lines, but the showing of an average line 37 is sufficient. The flux field interlinks the rings (7, 13), 25 and clutch plate 31. To do this, it must cross the liners 33. It is these liners, which were heretofore either omitted or which were nonmagnetic, which if used caused the high reluctance that required excessively high magnetomotive forces of the exciter. When omitted a modulated closing of the clutch was not possible because of the sudden final violent closing action which occurs between the extremely low-reluctance ferromagnetic surfaces which are attracted together in a magnetic field. I avoid both of these difficulties by composing the liners 33 of a substance which has not only good wearing, frictional and heat-resistant properties but in addition I make this material partially magnetic. A suitable tough and resilient base-forming material is as follows, proportions being given by volume:

| | |
|---|---|
| Crepe rubber | 14 |
| Litharge | 10 |
| Barytes | 5 |
| Zinc oxide | 5 |
| Carbon black | 3 |
| Graphite | 20 |
| Sulphur | 4 |
| Asbestos yarn shreds | 12 |
| Brass wire shreds | 5 |

To the above is added a volume (totalling one-third of the total volume of the listed items) of a finely divided or powdered iron such as Carbonyl-E iron. As an alternative, Swedish powdered iron of, say, 300 mesh, may also be used. Nickel steel particles which in effect are also iron particles are also useful (although not preferable), as well as other equivalents well known in the electrical art. The above-mentioned materials are thoroughly mixed into a paste and molded and cured by pressure and heat to form a sheet slightly over 1/16 inch thick. The molding and curing procedure is substantially the same as that usually used for molding and curing prior brake and clutch linings. In general existing formulas used in the manufacture of clutch and brake linings can be satisfactorily used with the addition of magnetic material in approximately the above proportions. The general criterion for the amount of powdered magnetic material to be added is that it shall substantially reduce the magnetic reluctance of the final liner material without unduly interfering with its desired frictional wearing and heat-resistant properties; also the material must retain its properties of toughness as distinguished from frangibility and be somewhat resilient.

An important feature of the mixture is the substantial proportion of finely divided iron which converts the lining from a high-reluctance material to one of lower magnetic reluctance. It is obvious that since the iron particles do not constitute the entire substance of the liners, the reluctance of the liners will not be as low as that of the ferromagnetic materials of which the parts 7, 13, 25 and 31 are composed. Thus the liners become partially magnetic. Consequently, the toroidal flux field 37 can be forced to cross the gaps between the members (7, 13), 31 and 25 with a much smaller magnetomotive force from the coil 11 than would be necessary in the case of a totally nonmagnetic liner, but on the other hand the reluctance will not be as low as would be the case if parts 7, 13, 25 and 31 were unlined.

Before the coil 11 is excited, the members (7, 13), 33 and 25 have the positions shown in the drawings. As soon as the coil 11 is energized to produce the toroidal flux field 37, the ring 25 will be drawn toward the ring (7, 13), thus clamping between them the assembly 31, 33 with a frictional engagement which is responsible for the driving torque. But no magnetic metal faces can engage, which in the case of unlined magnetic clutches, caused violent unmodulated closing action. Clutch closing can therefore be modulated by modulating excitation of coil 11, which would be impossible were the liners omitted.

While the invention is shown as being carried out in connection with a so-called single disc, dry type of clutch, it will be understood that it may also be used in multi-disc clutches either of the dry or wet (oil immersed) variety; also cone clutches, radial clutches etc., by modifications which will be obvious to those skilled in the art. As above indicated, the term clutch as used in the following claims includes braking apparatus, wherein the members are rotary relative to one another but one is fixed relatively to the frame of the machine.

The magnetic properties of the material which is incorporated in the liners should not be substantially retained when the coil 11 is deenergized. The rings 7, 13, 25 and 31 should have this same property. In other words, all of the parts and the included powdered magnetic material should preferably have low remanence and low retentivity. This is so that the clutch will release effectively when deenergized. In this respect materials such as the Carbonyl-E iron, Swedish powdered iron (above mentioned), and the like are superior to the nickel steel (also above mentioned).

Reference is hereby made under Rule 78 to my co-assigned copending U. S. patent application, Serial No. 242,761, filed August 20, 1951, for Magnetic Clutch, now abandoned; and to the co-assigned copending U.S. patent application of Martin P. Winther, Serial No. 110,211, filed August 13, 1949, for Magnetic Clutch and Lining Therefor.

The invention has the advantage that during all phases of operation the solid ferrous faces are kept from engagement. This prevents grabbing upon excitation, with what is often referred to as better modulation, i. e., a smooth non-grabbing controlled closure according to the excitation of coil 11. On the other hand, this better modulation is obtained without an excessive number of ampere turns being required of coil 11. These results are obtained because the over-all reluctance of the liner 33 is below that of ordinary frictional lining but above that of the solid magnetic materials of members 31, 25, 13 and 7.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A magnetically operated friction clutch the closing action of which in response to excitation may be modulated, comprising driving and driven magnetic members which are relatively rotary when the clutch is released, means for mounting at least one of said members for axial movement relative to the other, said members having opposed solid low-reluctance ferrous metal faces, an electromagnetic coil producing when excited a flux field interlinking said members through said metal faces for axially attracting the driving and driven members one to the other to effect approach between them, and a liner interposed between said faces consisting of a substantially wear-resisting frictional substance containing heat-resistant shreds of relatively high reluctance to said flux, interspersed with comminuted particles of a ferrous magnetic material of relatively low reluctance to said flux, said comminuted material reducing the over-all magnetic reluctance of the liner to a value below that of said frictional substance but above that of said solid ferrous faces.

2. Apparatus made according to claim 1, wherein the wear-resisting substance is constituted by shreds of asbestos and wire in a nonmagnetic binding matrix, said matrix also binding said ferrous particles among said shreds.

3. Apparatus made according to claim 1, wherein the wear-resisting substance is constituted by shreds of asbestos and nonmagnetic wire in a nonmagnetic binding matrix, said matrix also binding said ferrous particles among said shreds.

4. A magnetically operated friction clutch comprising driving and driven elements which are relatively rotary when the clutch is released, two ferrous rings carried by one of said elements, said rings being coupled together for equal rotary movements and relative axial movements, a ferrous clutch plate member attached to the other element and located between said ferrous rings, the ferrous rings and ferrous plate member having low reluctance and ferrous metal faces, an electromagnetic coil producing when excited a flux field interlinking said rings and plate member through said metal faces and axially attracting together the rings to clamp the plate member therebetween, and a liner interposed between each side of the plate member and the adjacent ring consisting of ring-like members each comprising a substantially wear-resisting frictional substance of relatively high reluctance to said flux interspersed with comminuted particles of a ferrous magnetic material of relatively low reluctance, said comminuted material reducing the over-all magnetic reluctance of the liner members to a value below that of said frictional substance but above that of said ferrous faces.

5. A magnetically operated friction clutch comprising driving and driven magnetic members which are relatively rotary when the clutch is disengaged, means for mounting at least one of said members for axial movement relative to the other, said members having opposed low-reluctance ferrous metal faces, an electromagnetic coil producing when excited a flux field interlinking said members through said faces and axially attracting the driving and driven members one to the other to effect approach between them, and a solid liner interposed between said faces consisting of a solid material mixture located in the path of flux interlinkage, said mixture comprising a frictional substance having a relatively high reluctance to said flux, said substance being substantially wear- and heat-resistant when subjected to driving friction as the clutch engages, said wear- and heat-resistant substance being interspersed with comminuted particles of a ferrous magnetic material of relatively low reluctance to said flux, said comminuted particles reducing the over-all magnetic reluctance of the solid liner to a value below that of said wear- and heat-resistant frictional substance but above that of said ferrous faces.

ANTHONY WINTHER.

REFERENCES CITED

The following references are of record in the file of this patent:

UNITED STATES PATENTS

| Number | Name | Date |
|---|---|---|
| 414,307 | Gorham | Nov. 5, 1889 |
| 1,622,261 | Payne | Mar. 22, 1927 |
| 1,700,759 | Borehers | Feb. 5, 1929 |
| 1,762,420 | Prime | June 10, 1930 |
| 1,925,956 | Easter | Sept. 5, 1933 |
| 1,968,583 | Apple | July 31, 1934 |
| 2,100,347 | Nanfeldt | Nov. 30, 1937 |
| 2,136,370 | Backius | Nov. 15, 1938 |
| 2,178,527 | Wellman | Oct. 13, 1939 |
| 2,359,361 | Gleszer et al. | Oct. 3, 1944 |

FOREIGN PATENTS

| Number | Country | Date |
|---|---|---|
| 556,182 | Great Britain | Sept. 23, 1943 |